Feb. 3, 1925. 1,524,968
G. L. DES YLOUSES
APPARATUS FOR THE PRODUCTION OF HIGH NITROGEN CONTENT CYANAMIDE GRANULES
Original Filed Jan. 17, 1922
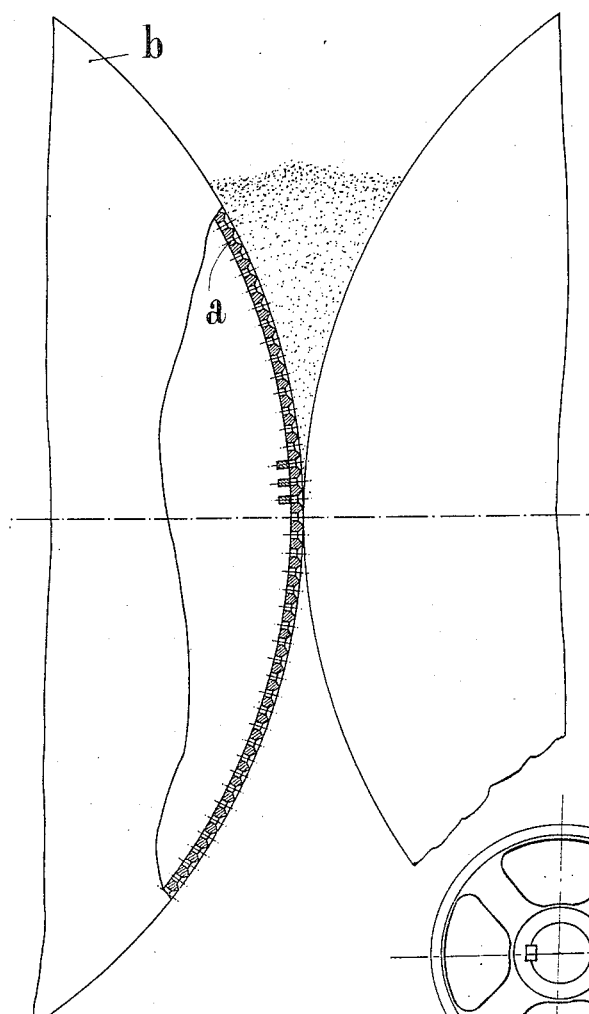
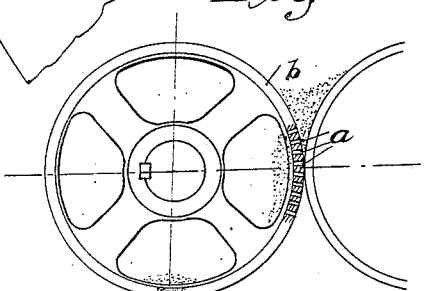
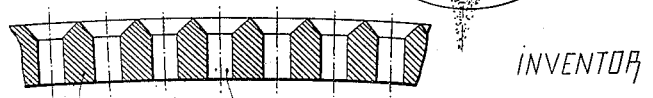
INVENTOR
Gaston Lefort des Ylouses
By
ATTORNEY Patented Feb. 3, 1925.

1,524,968

UNITED STATES PATENT OFFICE.

GASTON LEFORT DES YLOUSES, OF PARIS, FRANCE, ASSIGNOR TO LA SOCIETE L'AZOTE FRANCAIS, OF PARIS, FRANCE, A CORPORATION OF FRANCE.

APPARATUS FOR THE PRODUCTION OF HIGH-NITROGEN-CONTENT CYANAMIDE GRANULES.

Original application filed January 17, 1922, Serial No. 529,902. Divided and this application filed February 29, 1924. Serial No. 696,004.

*To all whom it may concern:*

Be it known that I, GASTON LEFORT DES YLOUSES, a citizen of the Republic of France, residing at Paris, France, have invented new and useful Improvements in Apparatus for the Production of High-Nitrogen-Content Cyanamide Granules, of which the following is a specification.

Granulation of cyanamide, which constitutes a very important but most delicate operation, has been obtained by numerous processes.

The following requirements must, however, be answered, namely: that the granules formed do not collapse into dust in a few weeks or even months; that the granulating operation does not cause too considerable an escape of nitrogen (as ammonia); that the granules obtained do not lose too great a portion of their nitrogen (as ammonia) between making and using—i. e., generally after a few months; that the per cent of cyanamide transformed into dicyandiamide be small; and lastly that the per cent of agglomerating agent be sufficiently small to enable the nitrogen grade of the granules obtained to remain marketable.

The present invention relates to the production of stable cyanamide granules of high nitrogen content; such production being characterized by the facts that extremely high pressure is exerted on raw cyanamide treated in small quantities, that the amount of water added does not exceed from 15 to 20%, and that the water and the cyanamide form an absolutely homogeneous paste or mixture with no excessive rise in temperature. The actual procedure itself, however, forms the subject of my prior application, No. 529,902, filed January 17, 1922, which resulted in Patent No. 1,495,551 whereof this case forms a division. Accordingly, no claim for the process is made herein, but only for the apparatus by which the process is carried out; such apparatus preferably embodying a pair of oppositely-rotating cylinders, at least one of which is provided with numerous holes or perforations for the expulsion of the cyanamide therethrough. These holes may advantageously taper inwards so as to work in the same way as the perforations of a drawing plate.

As prepared, the pasty mixture of raw cyanamide and water is fed between the two cylinders and thus forced through the holes under very high pressure. Due to the rotation of the cylinders, the cyanamide filaments, threads or strips break into short bits which constitute the granules and are constantly ejected. The granules so formed are left alone until completely hardened, such hardening requiring a few hours. During this period, the granules should be spread in a thin layer in order that diffusion of heat may readily take place. Were they heaped up, the temperature would rise rapidly and the loss of nitrogen become excessive.

For water, there may be substituted a concentrated solution of calcium nitrate. The product so obtained offers the advantage of containing both promptly assimilable nitrogen (nitrate) and reserve nitrogen (cyanamide).

An embodiment of the invention is illustrated in the accompanying drawing, wherein:

Figure 1 is a fragmental side elevation of the two coacting press cylinders, with the perforated press cylinder partly in section;

Fig. 2 is an enlarged detail of said perforated cylinder; and

Fig. 3 is a view, on a greatly reduced scale, showing the granules falling down within the perforated cylinder and being discharged at the bottom thereof.

Referring to said drawings, the perforated press cylinder $b$ is about 12 millimeters thick, and the holes $a$ through which the product is forced are flared at their outer ends but are otherwise cylindrical. Thus, by forcing under pressure the product through the holes $a$ of the perforated cylinder, a series of small cylindrical threads, strips or filaments is obtained which, on issuing from the holes, break off in short bits within cylinder $b$ and fall down in said cylinder, and are discharged at the bottom thereof.

Holes $a$ remain filled with cyanamide during the entire operation, each cyanamide granule remaining enclosed in the hole $a$ in which it was housed during a complete revolution of the cylinder. The material undergoes, so to say, a moulding period after the period of high pressing, and this moulding period is followed by the ejection of the material contained in the hole $a$, while such material is being replaced therein by a fresh charge. As will be apparent, the ejection of each granule is effected when the granule has assumed its final shape, and the final outer surface of the granule is the one that was in contact with the inner walls of the hole $a$ wherein it was housed.

This finally-shaped thread, strip or filament plays an apparently important part as regards crust stability of the granules.

The time during which the material stays in the cylindrical part of the holes, after being compressed, seems of highest importance as concerns proper maintenance of the granule. By analogy, the said stay may be compared to what occurs in working with concrete: the concrete, after being cast, must remain for a more or less considerable time in the moulds until it has set, and the outer envelope has acquired sufficient cohesion to prevent the inside mass from collapsing.

Due to the above described process, granules are obtained which, when packed in ordinary bags, will not collapse into dust, but keep their shape for a practically indefinite time, whereas all the cyanamide granules made hitherto did under such conditions collapse, very rapidly, into dust and underwent incomparably heavier losses of usable nitrogen in the form of ammonia and of poisonous dicyandiamide. Despite this remarkable stability of the granules, the whole of the nitrogen contained therein is rapidly extracted when they are spread as manure and put into contact with more or less damp soil, although they keep their exterior shape.

I claim as my invention:—

Apparatus for granulating cyanamide, comprising a pair of oppositely-rotatable, coacting cylinders, between which the cyanamide is introduced, one cylinder being hollow and having its circumferential wall provided with a multitude of perforations which are flared at their outer ends but otherwise are cylindrical.

In testimony whereof I affix my signature.

GASTON LEFORT des YLOUSES.